(12) United States Patent
King et al.

(10) Patent No.: US 8,013,548 B2
(45) Date of Patent: Sep. 6, 2011

(54) SYSTEM, VEHICLE AND RELATED METHOD

(75) Inventors: Robert Dean King, Schenectady, NY (US); Gary Raymond Kilinski, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 508 days.

(21) Appl. No.: 12/250,582

(22) Filed: Oct. 14, 2008

(65) Prior Publication Data

US 2010/0090525 A1    Apr. 15, 2010

(51) Int. Cl.
  *H02P 1/54* (2006.01)
  *B60L 1/00* (2006.01)

(52) U.S. Cl. .......... 318/139; 318/439; 307/9.1; 307/10.1

(58) Field of Classification Search .................. 318/139, 318/254, 439, 106, 140; 307/9.1, 10.1; 180/65, 180/265
  See application file for complete search history.

(56) References Cited

U.S. PATENT DOCUMENTS

| | | | |
|---|---|---|---|
| 4,533,011 A | 8/1985 | Heidemeyer et al. |
| 4,862,009 A | 8/1989 | King |
| 4,926,104 A | 5/1990 | King et al. |
| 5,168,975 A | 12/1992 | Bernhardt et al. |
| 5,345,154 A | 9/1994 | King |
| 5,373,195 A | 12/1994 | De Doncker et al. |
| 5,589,743 A | 12/1996 | King |
| 5,710,699 A | 1/1998 | King et al. |
| 5,713,425 A | 2/1998 | Buschhaus et al. |
| 5,722,502 A | 3/1998 | Kubo |
| 5,723,956 A | 3/1998 | King et al. |
| 5,780,980 A | 7/1998 | Naito |
| 5,903,449 A | 5/1999 | Garrigan et al. |
| 5,949,658 A | 9/1999 | Thottuvelil et al. |
| 6,170,587 B1 | 1/2001 | Bullock |
| 6,186,255 B1 | 2/2001 | Shimasaki et al. |
| 6,227,997 B1 | 5/2001 | Fujisawa et al. |
| 6,258,006 B1 | 7/2001 | Hanyu et al. |
| 6,319,168 B1 | 11/2001 | Morris et al. |
| 6,331,365 B1 | 12/2001 | King |
| 6,332,257 B1 | 12/2001 | Reed, Jr. et al. |
| 6,360,834 B1 | 3/2002 | Gauthier |
| 6,401,850 B1 | 6/2002 | Bowen |
| 6,441,581 B1 | 8/2002 | King et al. |
| 6,478,705 B1 | 11/2002 | Holmes et al. |

(Continued)

FOREIGN PATENT DOCUMENTS

DE    10213105 A1    7/2002

(Continued)

*Primary Examiner* — Paul Ip
(74) *Attorney, Agent, or Firm* — Joseph J. Christian

(57) ABSTRACT

A system includes a first energy storage system electrically coupled to a DC-link, and the first energy storage system comprises a first energy source that can exchange electrical power with an electric motor through the DC-link; a boost converter coupled to the DC-link; a second energy storage system that can be reversibly electrically coupled to the boost converter through a contactor, and wherein an operating voltage of the second energy storage system is less than an operating voltage of the first energy source; and the second energy storage system comprises both an energy battery and a second energy source, and the second energy source has an operating voltage that is higher than the energy battery and is lower than the first energy source operating voltage. A vehicle incorporating the system and a related method are provided.

28 Claims, 1 Drawing Sheet

U.S. PATENT DOCUMENTS

Figure 1:
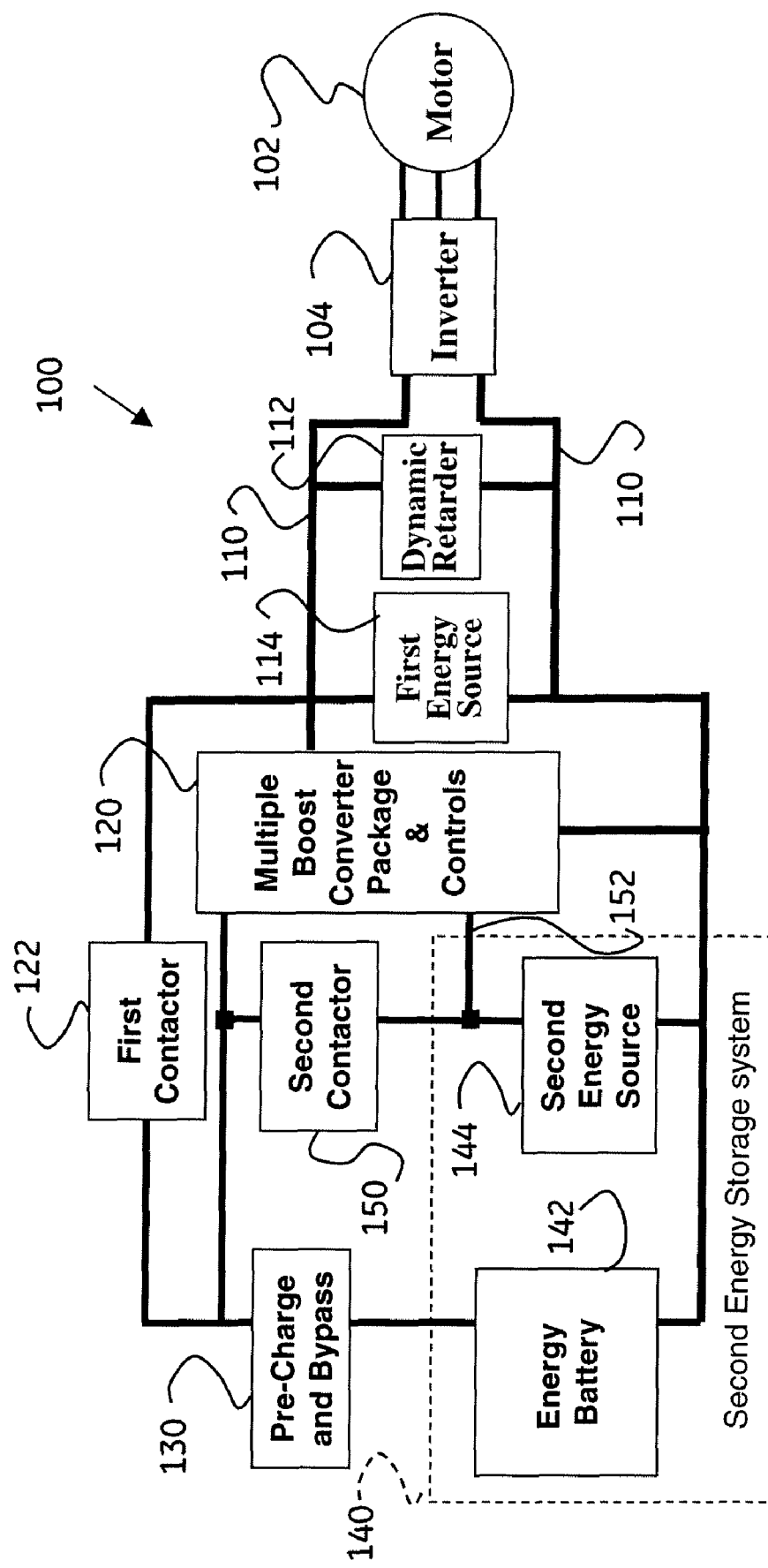

| | | |
|---|---|---|
| 6,481,517 B1 | 11/2002 | Kobayashi et al. |
| 6,486,568 B1 | 11/2002 | King et al. |
| 6,507,128 B2 | 1/2003 | King et al. |
| 6,533,692 B1 | 3/2003 | Bowen |
| 6,533,693 B2 | 3/2003 | Bowen et al. |
| 6,569,055 B2 | 5/2003 | Urasawa et al. |
| 6,592,484 B1 | 7/2003 | Tsai et al. |
| 6,603,215 B2 | 8/2003 | Kuang et al. |
| 6,604,591 B2 | 8/2003 | Bowen et al. |
| 6,645,105 B2 | 11/2003 | Kima |
| 6,679,799 B2 | 1/2004 | Bowen |
| 6,729,423 B2 | 5/2004 | Kobayashi et al. |
| 6,737,822 B2 | 5/2004 | King |
| 6,784,563 B2 | 8/2004 | Nada |
| 6,817,432 B2 | 11/2004 | Kitada et al. |
| 6,837,816 B2 | 1/2005 | Tsai et al. |
| 6,915,220 B2 | 7/2005 | Cardinal et al. |
| 7,349,797 B2 | 3/2008 | Donnelly et al. |
| 7,568,537 B2 | 8/2009 | King |
| 7,595,597 B2 * | 9/2009 | King et al. .............. 318/139 |
| 7,866,425 B2 * | 1/2011 | King et al. ............. 180/65.31 |
| 2001/0051291 A1 | 12/2001 | Aoyagi et al. |
| 2004/0062059 A1 | 4/2004 | Cheng et al. |
| 2005/0122071 A1 | 6/2005 | King et al. |
| 2005/0284676 A1 * | 12/2005 | King et al. ............. 180/65.3 |
| 2006/0267410 A1 * | 11/2006 | Kanouda et al. ........... 307/66 |
| 2007/0007939 A1 | 1/2007 | Miller et al. |

FOREIGN PATENT DOCUMENTS

| | | |
|---|---|---|
| EP | 1366948 A1 | 12/2003 |
| EP | 1500549 A2 | 1/2005 |

* cited by examiner

SYSTEM, VEHICLE AND RELATED METHOD

BACKGROUND

1. Technical Field

The invention includes embodiments that relate to a propulsion system. The system may be used in a vehicle according to embodiments of the invention. A method related to the system and/or vehicle is provided according to embodiments of the invention.

2. Discussion of Related Art

Some vehicles may include a propulsion system that includes both a combustion engine and a battery. For a parallel-type hybrid vehicle, the vehicle power train can be driven by mechanical energy from the engine or by mechanical energy from an electric motor. The electric motor can be of relatively high voltage. The battery, however, can be of relatively lower voltage than the electric motor. The voltage differential may be addressed using a boost converter; and, a bi-directional boost converter allows the high-voltage side to communicate with the low-voltage side of the circuit. The DC-link can be on the high-voltage side of the boost converter. There may be some efficiency loss across the boost converter, and the larger the voltage differential the larger the potential loss. Further, the inclusion of diodes in the circuit may introduce potential opportunities for additional loss. It is desirable to identify, reduce and eliminate sources of efficiency loss.

Accordingly, sometimes it may be desirable to have a vehicle that differs from those vehicles that are currently available. It may be desirable to have a hybrid vehicle that has a powertrain differing from powertrains that are presently available. It may be desirable to have methods relating to a hybrid powertrain operation that differ from methods presently available.

BRIEF DESCRIPTION

In one embodiment, a system includes a first energy storage system electrically coupled to a DC-link, and the first energy storage system comprises a first energy source that can exchange electrical power with an electric motor through the DC-link; a boost converter coupled to the DC-link; a second energy storage system that can be reversibly electrically coupled to the boost converter through a contactor, and wherein an operating voltage of the second energy storage system is less than an operating voltage of the first energy source; and the second energy storage system comprises both an energy battery and a second energy source, and the second energy source has an operating voltage that is higher than the energy battery and is lower than the first energy source operating voltage.

In one embodiment, a vehicle propulsion system includes an alternating current (AC) electric motor; a first energy storage system electrically coupled to the electric motor through a direct current (DC) link and that comprises a first energy source; a second energy storage system electrically coupled to the electric motor such that a voltage output from the second energy storage system is decoupled from the DC link using a bi-directional boost converter, a the second energy storage system includes a second energy source and a high-specific energy battery; and a contactor that is poled to conduct current from a low voltage side of a boost converter to a high voltage side of the boost converter, and the contactor is controlled to open or to close based on a voltage differential being within a threshold amount.

In one embodiment, a method includes exchanging electrical power from a first energy source of a first energy storage system with an electric motor through a DC-link and further to a boost converter; reversibly electrically coupling a second energy storage system to the boost converter through a contactor in response to an operating voltage measurement of the second energy storage system being less than an operating voltage of the first energy source, wherein the second energy storage system comprises both an energy battery and a second energy source, and the second energy source has an operating voltage that is higher than the energy battery but is lower than the first energy source operating voltage.

BRIEF DESCRIPTION OF THE DRAWING FIGURES

FIG. 1 is a schematic block diagram of a system according to an embodiment of the invention.

DETAILED DESCRIPTION

The invention includes embodiments that relate to a propulsion system. The system may be used in a vehicle according to embodiments of the invention. A method related to the system and/or vehicle is provided according to embodiments of the invention.

A discussion of terms and components may inform the reading of this disclosure. As used herein, an inverter converts DC power to AC power. A rectifier converts AC power to DC power. The term "converter" may be used to refer to inverters and rectifiers. A retarder includes an electric motor capable of affecting a speed associated with an apparatus. The retarder may further include components that receive electricity generated by the motor when functioning as a retarder. These optional retarder components can include one or more electrically resistive grids, power dissipation devices, power and/or energy storage devices, or electrical acceptance systems.

An electric link can be an AC link or a DC link based on the system requirements. The DC link should be assumed unless context or language indicates the AC link is intended or possible. A suitable DC link can include positive/negative lines, and additional active or passive components can be added to the DC link as needed, such as a capacitor or a filter. The DC link can be coupled to the alternator. And, the DC link may be coupled to one or more insulated gate bipolar transistors (IGBT) and gate turn-off thyristors (GTO) if such are present. A Texas Instruments digital signal processor (DSP) can provide control to the DC/DC converter, particularly when multiple converters connect to a single DC link. While not referred to specifically, the DC power to and from the DC link may be converted to AC power to interface with, for example, the traction motor (as necessary) or the alternator, in an AC system. For a DC system, there may not be filters if the DC link is directly coupled to the motor. However, filters may be used if a chopper or if an energy storage device is used. The AC link can include a voltage, frequency and phase change device.

An energy battery is a battery that exhibits relatively high specific energy, but only moderate specific power. For example, an energy battery may have a specific energy in the range of from about 60 Wh/kg to about 150 Wh/kg and specific power in the range of from about 100 W/kg to about 250 W/kg. The ratio of specific power divided by specific energy, or P/E ratio may be used to characterize a battery. For the above example involving energy batteries, the range of P/E values are about $0.7\ hr^{-1} \rightarrow 4.2\ hr^{-1}$. An on-road passenger Hybrid Vehicle may use a battery where the P/E ratio is about 15 hr$^{-1}$→50 hr$^{-1}$, which is an example of a power battery.

The energy storage device can include one or more separate storage components, and the components can be the same or different from each other in, for example, function or composition or type. Some examples may be illustrative: the energy storage device can include an energy battery plus a power battery; an energy or power battery plus a capacitor or quick capture/release device; or a flywheel plus a battery. The energy storage device can include a sodium metal halide battery, a sodium sulfur battery, a lithium-based battery, a nickel metal hydride battery, a nickel cadmium battery, or a lead acid battery, and these can be used alone or in combinations as appropriate based on the system needs. Each of these foregoing batteries may be included with other storage types, such as mechanical storage, chemical storage, pressure storage, or thermal storage. Mechanical storage can include flywheels or springs. Chemical storage can include fuel cell reactants (e.g., hydrogen, oxygen, and the like). Pressure and thermal storage are self-evident.

A contactor is an electrically controlled switch (or equivalent) used for switching a power circuit. Suitable contactors are commercially available, and may be selected based on application specific parameters.

In one embodiment, a system includes a first energy storage system electrically coupled to a DC-link. The first energy storage system includes a first energy source that can exchange electrical power with an electric motor through the DC-link. A boost converter can be coupled to the DC-link. A second energy storage system can be reversibly electrically coupled to the boost converter through a contactor. An operating voltage of the second energy storage system is less than an operating voltage of the first energy source. The second energy storage system includes both an energy battery and a second energy source, and the second energy source has an operating voltage that is higher than the energy battery and is lower than the first energy source operating voltage. Optionally, a second contactor can be poled to conduct current from the high specific energy battery to the second energy storage system.

The second energy source may have a voltage rating that differs from the voltage rating of the other components in the first energy storage system, such as the energy battery. A suitable second energy source can be an ultracapacitor. The second energy source may have a voltage rating that is more than the voltage rating of the energy battery, but less than the voltage rating of the high side of the boost converter. The second energy source may be greater than two times greater voltage rating relative to the energy battery. In one embodiment, the second energy source voltage rating is in a range of from about 1.2 to about 2, or about 2 to about 3 times greater than a nominal voltage rating of the high specific energy battery. Selection of the voltage relation of the second energy source may be based on such factors as the desire to decrease both the internal loss within the second energy source, and to decrease loss across the buck-boost converter, thereby increasing the system efficiency, responsiveness to charge time from the energy battery, and the ability to feed power to multiple modules of the boost converter at the same time.

Continuing the point regarding the reduction of losses to improve efficiency, the first energy source can have a voltage rating that is greater than the maximum voltage rating of the second energy source. In one embodiment, the first energy source can have a voltage rating that is in a range of from about two to about six times greater. The selection can be based on such factors as the designed voltage of the energy battery (allowing for flexibility in series/parallel packaging of the battery cells); the voltage rating of the traction motor; the voltage rating of the power electronic and passive components; the voltage of the grid connection available to charge the energy source at high efficiency and power factor, the desired use/capability of a vehicle including a system according to an aspect of the invention; and other factors, such as travel range, recharge considerations, and the like.

An optional pre-charge circuit can be coupled to the first energy source, and can at least partially charge the first energy source. A suitable first energy source is an ultracapacitor. Suitable ultracapacitors, and equivalents, are commercially available and can be selected based on application specific parameters. A second contactor can be poled between the pre-charge circuit and the first energy source. In one embodiment, the energy battery and the pre-charge circuit can cooperate with each other to charge the first energy source.

Where the contactors are used, a plurality of sensors that can monitor the first energy storage system operating voltage and the second energy storage system operating voltage. A controller can communicate with the sensors and associated operator commands and can control the contactor to operate. Such operation may include a switch to close based on a voltage differential being within a threshold amount. The threshold amount can be fixed based on application specific parameters, or can be variable and based on external factors. Control of the contactor to open is also based on external factors. Such external factors can include an efficiency setting, or a particular work environment or anticipated load, including the speed of the electric motor, the power of the electric motor, the operator torque demand via accelerator and brake pedal inputs, or combination of the above. The electric motor can have two or more channels, and the two channels of the electric motor can be controlled to operate in a parallel arrangement. The controller can interleave chopping of the two channels. Interleaving of the chopping can reduce current ripple in electric current supplied to the electric motor, thereby reducing the losses in motor windings and reducing harmonic losses in the motor, both of which will increase efficiency of the motor.

A dc/dc converter can be coupled to the boost converter package. The converter, in one embodiment, can have a power rating at least 25 percent less than a total power level that is transferable from the low voltage side to the high voltage side of the boost converter. A suitable boost converter can be a bidirectional boost converter, that could include multiple channels. In one embodiment, two or more channels of the bidirectional boost converter can be controlled to operate in a parallel arrangement. The controller can interleave chopping of the two channels. Interleaving of the chopping in the multi-channel bidirectional boost converter can reduce current ripple in the electric current supplied to and from the energy battery and second energy source, reducing loss within the internal resistance of the energy battery and second energy source, thereby further increasing system efficiency.

In another aspect of the invention, a vehicle propulsion system can include an alternating current (AC) electric motor; a first energy storage system electrically coupled to the electric motor through a direct current (DC) link and that includes a first energy source; a second energy storage system electrically coupled to the electric motor such that the voltage output from the second energy storage system is decoupled from the DC link using a bi-directional boost converter, a the second energy storage system includes a second energy source and a energy battery; and a contactor that is poled to conduct current from a low voltage side of a boost converter to a high voltage side of the boost converter, and the contactor is controlled to close based on a voltage differential being within a threshold amount, or based on one or more external factors. Control of the contactor to open can be based on external factors. Such external factors can include an efficiency setting, or a particular work environment or anticipated load, including the speed of the electric motor, the power of the electric motor, the operator torque demand via accelerator and brake pedal inputs, or a combination of the above.

A method includes exchanging electrical power from a first energy source of a first energy storage system with an electric motor through a DC-link and further to a boost converter; and reversibly electrically coupling a second energy storage system to the boost converter through a contactor in response to an operating voltage measurement of the second energy storage system being less than an operating voltage of the first energy source, wherein the second energy storage system comprises both an energy battery and a second energy source, and the second energy source has an operating voltage that is higher than the energy battery but is lower than the first energy source operating voltage.

A parallel hybrid vehicle includes a fuel converter engine that can supply mechanical power to the wheel through a transmission; and, the electric motor couples to the transmission to also supply mechanical power via the same pathway. An electric vehicle has the wheels driven by the electric motor only, and the electrical energy to power the electric motor can come from any source (such as a battery). A series hybrid electric vehicle has the wheels driven by the electric motor only, and the electrical energy to power the electric motor can come from any source (such as an engine-driven alternator, fuel cell, battery, flywheel, ultracapacitor, or a combination of these sources). In one embodiment, the vehicle can be a parallel hybrid vehicle. In another embodiment, the vehicle can be an all-electric vehicle. In another embodiment, the vehicle can be a series hybrid vehicle.

With reference to the vehicle, the vehicle can include a vehicle frame and chassis. Depending on the vehicle type, embodiments of the system can be suitably sized and configured for use in a particular application or end-use. Suitable applications may include an off-highway vehicle, an underground mining vehicle, a passenger vehicle, a marine vessel, or a locomotive. Each application may have constraints on the system design and operating parameters. For example, space or volume may be a factor in a passenger vehicle or locomotive application; whereas capacity or economic considerations may be a constraint on an off-highway vehicle or marine vessel.

With reference to FIG. 1, a system 100 is shown that includes an electric traction motor 102 coupled to an inverter 104. The inverter is coupled to a DC link 110. Also coupled to the DC link are a dynamic retarder 112, a first energy source 114, a multiple boost converter package 120 that includes the necessary controls, and a line in from a first contactor 122 to one channel of the multiple boost converter. The first contactor is coupled to a pre-charge/bypass circuit 130, which is in turn coupled to a second energy storage system 140. The pre-charge/bypass circuit is also coupled to the multiple boost converter package. The second energy storage system includes an energy battery 142 and a second energy source 144.

A second contactor 150 can be coupled between the second energy storage system and the multiple boost converter package. A by-pass line 152 allows the second energy storage system, and particularly the second energy source, to electrically communicate with another module of the multiple boost converter package. By using the by-pass line and closing the second contactor, multiple modules of the boost converter package can work in parallel. This may allow for increased power throughput, especially when the second energy source is operated at relatively low state of charge and interleaving control provides reduced ripple current in energy battery 142, thus reducing loss within the battery and thereby increasing system efficiency.

During one mode of operation, the first contactor can close and allow the pre-charge circuit to charge the first energy source, which can be a capacitor in one example. Conversely, electricity generated by the dynamic retarder during a retard event, at low speed and low voltage, can flow directly to the second energy storage system and avoid efficiency lost by passage through the buck-boost converter. During low speed and low motor voltage operation, with the first contactor in the closed position, electricity supplied from the energy battery (and potentially the second energy source, depending on the state of the second contactor) can flow directly to the second energy storage system, thus avoiding or reducing loss caused by passage through the buck-boost converter. Sensors (not shown) communicate with the first contactor to allow for such direct electrical coupling when the voltage differential is within a determined voltage range and motor speed and power is lower than a given thresholds. Further, a limp-home operating mode can allow the vehicle to drive on the lower voltage level of the second energy storage system in the event of, for instance, a failure of the first energy source or failure of the multiple channel boost converter.

The embodiments described herein are examples of structures, systems and methods having elements corresponding to the elements of the invention recited in the claims. This written description enables one of ordinary skill in the art to make and use embodiments having alternative elements that likewise correspond to the elements of the invention recited in the claims. The scope thus includes structures, systems and methods that do not differ from the literal language of the claims, and further includes other structures, systems and methods with insubstantial differences from the literal language of the claims. While only certain features and embodiments have been illustrated and described herein, many modifications and changes may occur to one of ordinary skill in the relevant art. The appended claims cover all such modifications and changes.

What is claimed is:

1. A system, comprising:
   a first energy storage system electrically coupled to a DC-link, and the first energy storage system comprises a first energy source that can exchange electrical power with an electric motor through the DC-link;
   a boost converter coupled to the DC-link;
   a second energy storage system that can be reversibly electrically coupled to the boost converter through a contactor, and wherein an operating voltage of the second energy storage system is less than an operating voltage of the first energy source; and
   the second energy storage system comprises both an energy battery and a second energy source, and the second energy source has an operating voltage that is higher than the energy battery and is lower than the first energy source operating voltage.

2. The system as defined in claim 1, wherein the second energy source has a voltage rating that is in a range of from about 1.2 to about 2 times greater than a nominal voltage rating of the energy battery.

3. The system as defined in claim 1, wherein the second energy source has a voltage rating that is in a range of from about 2 to about 3 times greater than a nominal voltage rating of the energy battery.

4. The system as defined in claim 1, further comprising a second contactor that is poled to conduct current from the energy battery to the second energy storage system, and the second energy storage system comprising a second energy source coupled on the boost converter low voltage side.

5. The system as defined in claim 1, wherein the first energy source has a voltage rating that is in a range of from about two to about six times greater than the maximum voltage rating of the second energy source.

6. The system as defined in claim 1, wherein further comprising a pre-charge circuit configured to at least partially charge the first energy source.

7. The system as defined in claim 6, wherein a second contactor is poled between the pre-charge circuit and the first energy source.

8. The system as defined in claim 6, wherein the energy battery and the pre-charge circuit cooperate with each other to charge the first energy source.

9. The system as defined in claim 1, further comprising a plurality of sensors that can monitor the first energy storage system operating voltage and the second energy storage system operating voltage, and control the contactor to close based on a voltage differential being within a threshold amount.

10. The system as defined in claim 1, further comprising a plurality of sensors that can monitor one or more external factors selected from the group consisting of motor speed and motor power, and control the contactor to close based on a motor speed or motor power value differential being within a determined amount.

11. The system as defined in claim 1, further comprising the electric motor, and wherein two channels of the electric motor are controllable to operate in a parallel arrangement, and a controller that can interleave chopping of the two channels.

12. The system as defined in claim 1, wherein the boost converter is bi-directional and has at least two channels, and the channels are controllable to operate in a parallel arrangement, and a controller that can interleave chopping of the at least two channels.

13. The system as defined in claim 1, further comprising the electric motor and means for reducing current ripple in electric current supplied to the electric motor or from the energy battery.

14. The system as defined in claim 1, further comprising a dc/dc converter that has a power rating at least 25 percent less than a total power level that is transferable from the low voltage side to the high voltage side of the boost converter.

15. A vehicle propulsion system, comprising:
an alternating current (AC) electric motor;
a first energy storage system electrically coupled to the electric motor through a direct current (DC) link and that comprises a first energy source;
a second energy storage system electrically coupled to the electric motor such that a voltage output from the second energy storage system is decoupled from the DC link using a boost converter, and the second energy storage system includes a second energy source and an energy battery; and
a contactor that is poled to conduct current from a low voltage side of the boost converter to a high voltage side of the boost converter, and the contactor is controlled to operate based on an external factor communicated to the controller.

16. The vehicle as defined in claim 15, wherein the external factor is a voltage differential of the low voltage side of the boost converter relative to the high voltage side of the boost converter being within a determined threshold amount.

17. The vehicle as defined in claim 15, wherein the external factor includes one or both of an acceleration signal, torque requirement signal, braking signal, motor speed, and motor power being in a determined range.

18. The vehicle as defined in claim 15, wherein the vehicle is a parallel hybrid vehicle.

19. The vehicle as defined in claim 15, wherein the vehicle is an all-electric vehicle.

20. The vehicle as defined in claim 15, wherein the second energy source has a voltage rating that is in a range of from about 1.2 to about 3 times greater than a nominal voltage rating of the energy battery.

21. The system as defined in claim 15, further comprising a second contactor that is poled to conduct current from the energy battery to the second energy storage system, and the second energy storage system comprising a second energy source coupled on the booster converter low voltage side.

22. The system as defined in claim 15, wherein the first energy source has a voltage rating that is in a range of from about 2 to about 6 times greater than the maximum voltage rating of the second energy source.

23. The system as defined in claim 15, further comprising a pre-charge circuit configured to at least partially charge the first energy source.

24. The system as defined in claim 23, wherein a second contactor is poled between the pre-charge circuit and the first energy source, and the energy battery and the pre-charge circuit cooperate with each other to charge the first energy source.

25. The system as defined in claim 15, further comprising a plurality of sensors that can monitor the first energy storage system operating voltage and the second energy storage system operating voltage, and control the contactor to operate based on a voltage differential being within a determined threshold amount.

26. The system as defined in claim 15, further comprising the electric motor, and wherein two channels of the electric motor are controllable to operate in a parallel arrangement, and further comprising a controller that can interleave chopping of the two channels.

27. The system as defined in claim 15, wherein boost converter is a multi-channel bi-directional boost converter, and at least two channels of the boost converter are controllable to operate in a parallel arrangement mode of operation, and further comprising a controller that can interleave chopping of the two channels.

28. A method, comprising:
exchanging electrical power from a first energy source of a first energy storage system with an electric motor through a DC-link and further to a boost converter; and
reversibly electrically coupling a second energy storage system to the boost converter through a contactor in response to an operating voltage measurement of the second energy storage system being less than an operating voltage of the first energy source, wherein the second energy storage system comprises both an energy battery and a second energy source, and the second energy source has an operating voltage that is higher than the energy battery but is lower than the first energy source operating voltage.

* * * * *